United States Patent
Bobry (10) Patent No.: US 6,229,565 B1
(45) Date of Patent: *May 8, 2001

(54) HAND-HELD ELECTRONIC CAMERA WITH INTEGRAL PRINTER

(76) Inventor: Howard H. Bobry, 18416 Olympic View Dr., Edmonds, WA (US) 98020

( * ) Notice: Subject to any disclaimer, the term of this patent is extended or adjusted under 35 U.S.C. 154(b) by 0 days.

This patent is subject to a terminal disclaimer.

(21) Appl. No.: 08/912,110

(22) Filed: Aug. 15, 1997

(51) Int. Cl.[7] .................................................. H04N 5/225
(52) U.S. Cl. ........................................... 348/207; 348/373
(58) Field of Search .................................. 348/207, 373; 358/906; 355/18; 396/429

(56) References Cited

U.S. PATENT DOCUMENTS

| | | |
|---|---|---|
| 4,074,324 | 2/1978 | Barrett . |
| 4,262,301 * | 4/1981 | Erlichman . |
| 4,802,014 | 1/1989 | Koga . |
| 4,864,410 | 9/1989 | Andrews et al. . |
| 4,937,676 | 6/1990 | Finelli et all. . |
| 4,939,588 | 7/1990 | Ushiro et al. . |
| 4,942,477 | 7/1990 | Nakamura . |
| 5,051,838 | 9/1991 | Cho et al. . |
| 5,093,675 * | 3/1992 | Koumura et al. ................. 346/143 |
| 5,231,501 | 7/1993 | Sakai . |
| 5,240,334 * | 8/1993 | Epstein et al. ...................... 400/88 |
| 5,493,409 * | 2/1996 | Maeda et al. . |
| 5,606,420 | 2/1997 | Maeda et al. . |
| 5,634,730 * | 6/1997 | Bobry ................................. 358/906 |
| 5,757,388 * | 5/1998 | Stephenson ...................... 396/429 |
| 5,786,835 * | 7/1998 | Ikeda et al. ....................... 347/106 |
| 5,835,136 * | 11/1998 | Watnabe ............................ 348/207 |

FOREIGN PATENT DOCUMENTS 186069    7/1989  (JP) .

OTHER PUBLICATIONS

Portable PC Camera '98 Design Guideline (best copy available).

* cited by examiner

Primary Examiner—Wendy R. Garber
Assistant Examiner—Alicia M. Harrington
(74) Attorney, Agent, or Firm—Rankin, Hill, Porter & Clark LLP (57) ABSTRACT

A camera and printer apparatus includes a hand-held housing; an electronic camera disposed in the housing for converting an optical image into an electronic image, and a color printer disposed in the housing for printing, based on said electronic image, the optical image on a medium outside the apparatus. In one embodiment, the printer is a color ink jet printer

4 Claims, 8 Drawing Sheets

HAND-HELD ELECTRONIC CAMERA WITH INTEGRAL PRINTER

BACKGROUND OF THE INVENTION

The invention relates generally to methods and apparatus for recording photographic images. More particularly, the invention relates to a fully self contained and hand-held recording apparatus that is operable to record electronically a photographic image, and to produce a print of the image on paper or any other suitable medium Electronic cameras utilizing solid-state image sensors such as charge-coupled devices (CCDs) or metal oxide semiconductor (MOS) arrays are well known. Video motion picture cameras, recording either analog or digital signals on magnetic tape, have substantially displaced film-based motion picture cameras from the consumer market. Similarly, electronic still cameras, which record individual images in semiconductor memory, on diskettes, or on other storage media, are replacing traditional film-based still cameras. Electronic cameras offer numerous advantages to the consumer, including the ability to reuse the recording medium, instant availability of the recording without processing, and the ability to transfer recorded images to a computer or other device for easy viewing, editing, or printing. Images captured by electronic cameras may be printed utilizing a separate computer and separate computer printer. In addition, dedicated printers have become available for use with electronic cameras. These printers are stand-alone devices which connect directly to the camera, but are limited to printing on specially prepared media which must be transported through the printer mechanism. Furthermore, these separate printers are inconvenient to carry with the camera because of their substantial added bulk and weight. Several embodiments of electronic cameras containing built-in printers have been disclosed in the prior art, but these require either the use of an expensive photosensitive print medium, or an intermediate transfer medium sensitive to heat or pressure which must be held or maintained in intimate contact with the print medium during a printing operation, and can also require multiple scans across a printing area, all these various features which can limit print speed and quality.

The objectives exist, therefore, for providing more convenient apparatus and methods for a hand-held and self contained electronic camera which is capable of printing images, either color or black and white, directly on a non photosensitive medium, without the use of an intermediate transfer medium, and with little or no increase in camera bulk or weight.

SUMMARY OF THE INVENTION

To the accomplishment of the foregoing objectives, the present invention contemplates a hand-held and self contained electronic recording apparatus that includes an electronic camera and a printer therefor. In one embodiment, such a recording apparatus includes a hand-held housing; an electronic camera disposed in the housing for converting an optical image into an electronic image, and a color printer disposed in the housing for printing, based on said electronic image, the optical image on a medium inside or outside the apparatus.

In accordance with another aspect of the invention, a hand-held and self contained electronic recording apparatus includes a hand-held housing; an electronic camera disposed in the housing for converting an optical image into an electronic image, and a printer disposed in the housing for printing in response to said electronic image on a medium outside the apparatus, said housing being manually held stationary against a surface of the medium during a printing sequence; said printer comprising a print head that moves between first and second positions during a printing sequence.

In a further embodiment, the invention contemplates a hand-held housing; an electronic camera disposed in the housing for converting an optical image into an electronic image, and a printer disposed in the housing for printing in response to said electronic image on a medium outside the apparatus, said housing being manually held stationary against a surface of the medium during a printing sequence; said printer comprising a print head that is stationary during a printing sequence.

In a further embodiment, the invention contemplates a hand-held housing, an electronic camera disposed in the housing for converting an optical image into an electronic image, and a printer disposed in the housing for printing in response to said electronic image on a medium outside the apparatus, said housing being manually positioned adjacent a surface of the medium and manually swept across a printing area on the medium during a printing sequence.

In a further embodiment, the invention contemplates a hand-held housing, an electronic camera disposed in the housing for converting an optical image into an electronic image, and a printer disposed in the housing for printing in response to said electronic image on a medium outside the apparatus, said housing being manually positioned adjacent a surface of the medium and manually swept across a printing area on the medium during a printing sequence, with a control circuit comprising compensation for reducing image distortion caused by unconstrained natural sweeping motion of the printer during a printing sequence.

In a further embodiment, the invention contemplates a hand-held housing; an electronic camera disposed in the housing for converting an optical image into an electronic image, and a printer disposed in the housing for printing the optical image by printing in response to said electronic image on a medium that is inside or outside the housing, said printer comprising an ink jet printer.

In a further embodiment, the invention contemplates a hand-held and self contained electronic image recording apparatus comprising: a single housing; an electronic camera disposed in the housing for recording an image in an electronic storage device, and a printer disposed in the housing for printing the recorded image without the use of a sensitized medium.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
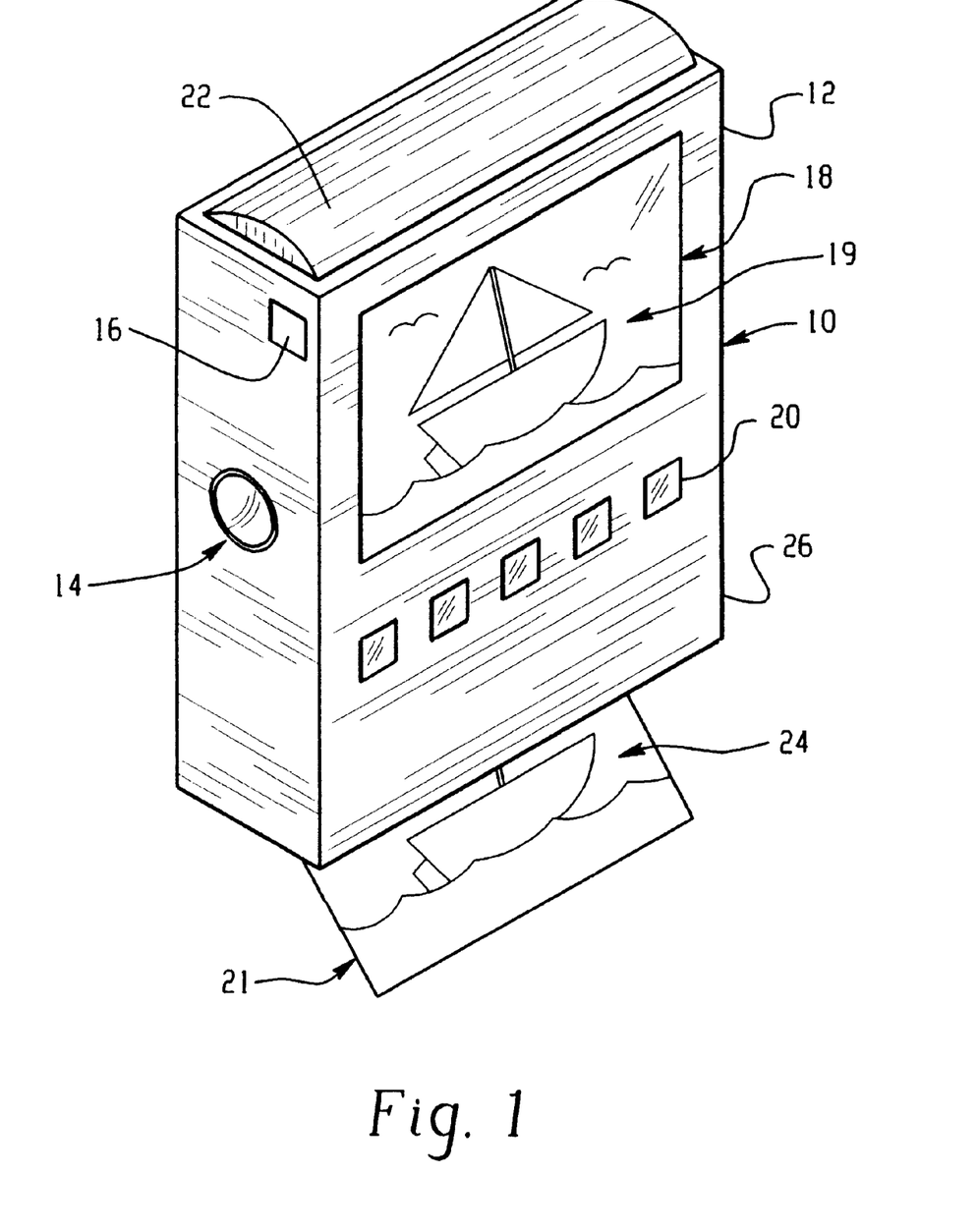
FIG. 1 is a simplified schematic perspective of a self contained and hand-held recording apparatus according to an embodiment of the present invention where printing takes place with the print medium inside the housing.

With reference to FIG. 1, an embodiment of the invention is illustrated in simplified schematic form for purposes of describing the basic concepts of the invention. In this exemplary configuration, a hand-held and self contained recording apparatus 10 is illustrated. While the invention is described and illustrated herein with reference to a particular camera design, such description is exemplary in nature. Those skilled in the art will appreciate that the present invention can be used with many different types of electronic camera designs which provide an electronic image in the form of data or signals that can be used or converted for use by a printer in accordance with the invention. Furthermore, the term "electronic camera" is used in its most general sense to refer to a hand-held and self contained electronic image recording apparatus which uses electronic image sensors in lieu of conventional photosensitive film to capture still and/or motion pictures for subsequent viewing, recording or printing. Those skilled in the art will further appreciate that the electronic image, once captured and recorded or stored, may be edited or manipulated prior to printing, such as, for example, by cropping, rotating, scaling, and so on.

In the embodiment of FIG. 1, the apparatus 10 is shown executing a printing sequence to print an image, which has been previously recorded on a medium 21. Although the invention is illustrated and described herein with reference to printing on a medium such as plain paper, for example, as used herein the term "medium" broadly refers to any suitable medium such as paper, plastic, or the like, which need not be sensitive to light, heat, or pressure, for example. The medium will be compatible with the printer mechanism 26, but otherwise can have an image printed thereon in like manner as plain paper without special sensitizing characteristics such as heat sensitive paper, photosensitive paper, pressure sensitive paper and so on. The medium selected may nonetheless be coated or otherwise treated, for example, to simulate the appearance and feel of photographic paper, or to otherwise enhance the quality and/or durability of the printed image. Those skilled in the art will readily appreciate that the invention can be utilized for recording and printing images in black and white or color on any medium that is compatible with the selected printer mechanism used in the apparatus 10, such as the exemplary printer apparatus described herein.

The image recording apparatus 10 includes an electronic camera that is preferably handheld and self-contained in a single housing 12. The camera portion of the apparatus 10 can be selected from any number of electronic camera designs, such as those described in U.S. Pat. Nos. 3,962,725 and 4,131,919 describing electronic motion picture and still picture cameras respectively, the entire disclosures of which are fully incorporated herein by reference, or a digital camera as described in the document entitled "Portable PC Camera '98 Design Guideline," published by Intel Corporation, the entire disclosure of which is fully incorporated herein by reference. The apparatus 10 further includes a printer mechanism 26, again that is self-contained within the housing 12. Exemplary embodiments of the printer mechanism 26 will be described with respect to FIGS. 2 and 3 as ink jet type printers, sometimes referred to as bubble jet printers, such printers being generally of the type that emits, projects or ejects ink through a number of nozzles across a gap to the print medium, in response to electrical control signals, so that each individual ink projection produces a dot on the print medium By printing across a gap, intimate contact between the printer and the print medium is not needed. In many applications of the invention, other printer mechanisms 26 both known and later developed will also be suitable for use with the present invention. Preferably, the printer mechanism 26 autonomously prints an image on the medium without need for an external control, input or processing function. However, the printer mechanism can be configured, as noted in the referenced patents herein, to receive or respond to control and input signals externally generated.

Although the housing 12 is preferably a single housing, the housing 12 could also be made up of separable connectable units. For example, the printer mechanism could be disposed in a separate housing that is attachable and detachable from the camera housing.

The housing 12 holds an image focusing lens 14 and a viewfinder 16. In the illustrated embodiment, the viewfinder 16 is a straight optical line of sight viewfinder, so that an eye piece will be located on the side of the housing opposite the viewfinder (not shown). The housing 12 also holds a visual display device 18 such as a conventional LCD color display, and a number of switches or keys 20 which may be used to set or select various functions of the apparatus 10. Such functions may include, for example, enabling or activating the apparatus in a picture taking mode of operation and/or a printing mode of operation.

An actuator 22 may be used as a shutter release, to initiate a picture taking sequence when the apparatus is in its picture taking mode, or to initiate a printing sequence when the apparatus is in its printing mode. Alternatively, separate actuators for picture taking and printing functions may be provided. Internal to the housing 12 (not shown in FIG. 1) is an image sensor such as a charge-coupled device (CCD) and a circuit board or boards which hold the various electronic components and power supply components for operating the electronic recording apparatus 10. As shown in FIG. 1, the apparatus is printing and ejecting a printed image 24 corresponding to a previously recorded image 19 displayed on the display device 18.

Figure 2:
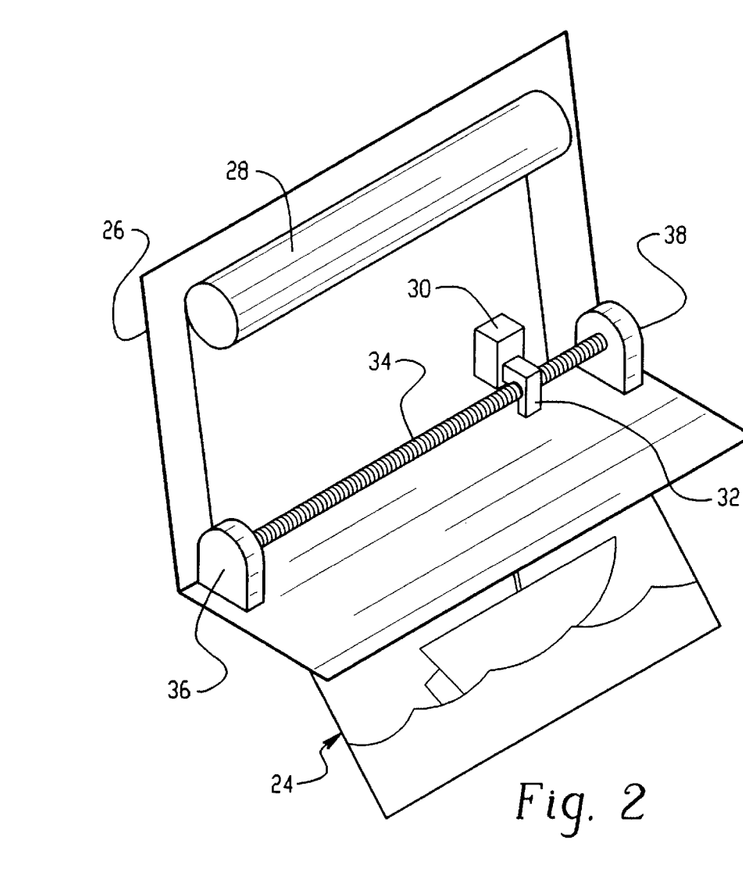
FIG. 2 is a simplified schematic drawing of a printer suitable for use in the embodiment of FIG. 1, using mechanically scanned ink jet print heads.

FIG. 2 shows, in simplified schematic form, one embodiment of a printer 26 suitable for use in the apparatus of FIG. 1. The recording medium 28 is stored in the form of a roll in this embodiment, and is fed past a replaceable inkjet recording cartridge 30 by a suitable feed mechanism such as motor driven pinch rollers (not shown). The inkjet recording cartridge 30 includes a print head that supplies cyan, magenta, and yellow colored inks and three sets of ink jet nozzles, one set for each color. The ink jet recording cartridge 30 may be any of a number of suitable types capable of printing in color on plain paper such as, for example, Hewlett-Packard part number 51625A. For applications where optimum image quality is desired, four color printing using cyan, magenta, yellow, and black inks may be used with either a four color print head, or with the addition of a separate black print head as is well known to those versed in the art. The inkjet recording cartridge 30 is mounted in a carriage 32 which not only holds the cartridge 30 but provides electrical interface means between the cartridge 30 and the printer control circuitry (not shown). The carriage 32 and the cartridge 30 are scanned bi-directionally across the width of the printed image 24 by a lead screw 34, driven by a bidirectional motor 36 and supported by a bearing 38. The cartridge 30 scanning is synchronized with the feeding of the print medium 28 through the apparatus so as to sweep cartridge 30 over the full area of printed image 24.

Figure 3:
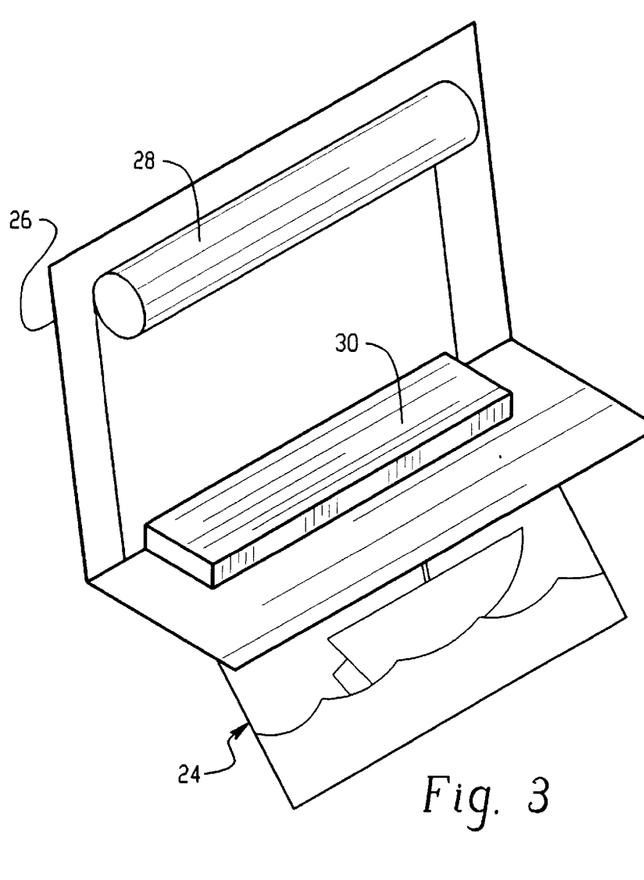
FIG. 3 is a simplified schematic drawing of an alternative printer suitable for use in the embodiment of FIG. 1, using full width ink jet print heads.

FIG. 3 shows, in simplified schematic form, another embodiment of a printer 26 suitable for use in the apparatus of FIG. 1. As in the embodiment of FIG. 2, the recording medium 28 is stored in the form of a roll and is fed past an ink jet print cartridge 30 by a suitable feed mechanism (not shown). In this embodiment, however, the ink jet print cartridge 30 includes, in addition to ink supplies, a wide ink jet head, or, alternatively, an array of ink jet heads forming a wide head, such that the print heads are capable of printing across the entire width of the printed image 24 without movement of the cartridge 30. Alternatively, the cartridge 30 may be swept across the medium while the recording medium remains stationary. Suitable ink jet print heads are described in U.S. Pat. No. 5,469,199, the entire disclosure of which is fully incorporated herein by reference, and in United States Patent application Ser. No. 08/685,248 filed on Jul. 23, 1996 entitled "Ink Jet Recording Head Apparatus", the entire disclosure of which is fully incorporated herein by reference.

In both of the embodiments illustrated in FIGS. 2 and 3, it will be readily understood by those skilled in the art that the print medium 28 stored in roll form may be readily replaced by a print medium stored as precut sheets in a suitable cartridge or magazine, or as individual sheets manually fed by the operator of the apparatus, or any other suitable means of supplying the print medium to the printer. Similarly, it will be understood that the scanning means shown are exemplary and for purposes of illustration only.

Figure 4:
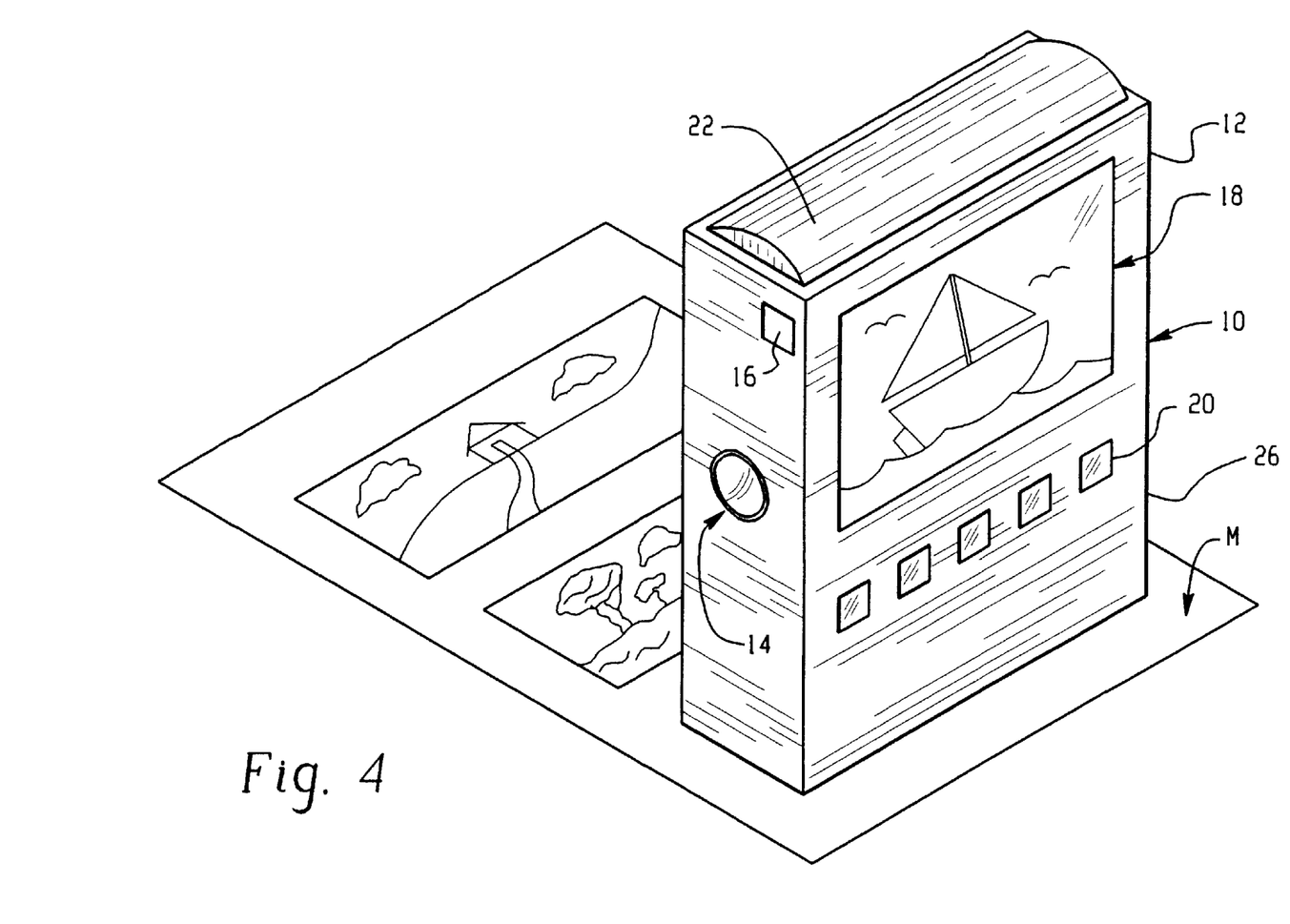
FIG. 4 is a simplified schematic perspective of a self contained and hand-held recording apparatus according to an embodiment of the present invention where the housing is held stationary on a print medium outside the housing during a printing sequence.

With reference to FIG. 4, another embodiment of the invention is illustrated. In this embodiment the apparatus includes the combination of an electronic camera, such as in the embodiment of FIG. 1, and a hand-held printer for printing on a medium outside the apparatus, with the housing manually held stationary against a surface of the medium during a printing sequence, as disclosed in U.S. Pat. No. 5,634,730 (herein the '730 patent) issued to Bobry on Jun. 3, 1997, the entire disclosure of which is fully incorporated herein by reference. In the embodiment of FIG. 4, the apparatus 10 is shown in position for a printing sequence, thus being disposed adjacent a medium, M, which may be, for example, a page of a photo albums The apparatus is shown positioned to print on a page on which two images have previously been recorded. As in all the embodiments herein, although the invention is illustrated and described with reference to printing on a flat web of paper, such as an album page, sheet paper, and so on, such description is exemplary for purposes of illustration and explanation and should not be construed in a limiting sense. Those skilled in the art will readily appreciate that the invention can be utilized for recording and printing images in black and white or color on any medium that is compatible with the selected printer used in the apparatus 10, such as the exemplary printers described herein.

The image recording apparatus 10 includes an electronic camera that is preferably hand-held and self contained in a single housing 12. The camera portion of the apparatus 10 can be selected from any number of electronic camera designs as in the previously described embodiment shown in FIG. 1, including lens 14, viewfinder 16, display device 18, switches or keys 20, and actuator 22.

The printer 26 is a printer as is described fully with respect to each of the embodiments shown in the '730 patent. As described in the '730 patent, the printer 26 includes a print head that can be, for example, an ink jet print head. The print head can further be, for example, an areal array print head that remains stationary, or a linear array head that moves within the housing across a printing area on the external medium.

Figure 5:
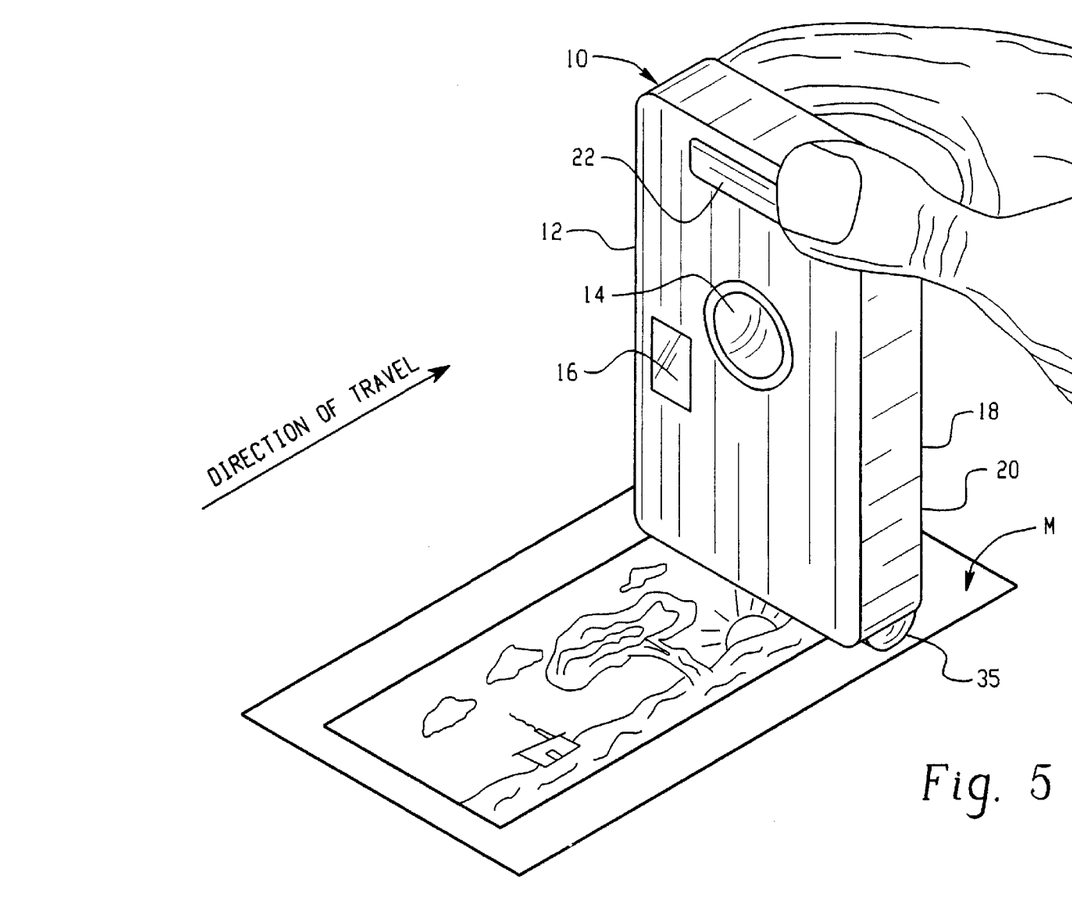
FIG. 5 is a simplified schematic perspective of a self contained and hand-held recording apparatus according to an embodiment of the present invention where the housing is manually swept with an unconstrained natural sweeping motion over a printing area on a print medium outside the housing during a printing sequence.

With reference to FIG. 5, another embodiment of the invention is illustrated. In this embodiment, the apparatus comprises the combination of an electronic camera, such as in the embodiment of FIG. 4, and a hand-held printer as disclosed in U.S. Pat. No. 5,593,236 (the '236 patent herein) issued to Bobry on Jan. 14, 1997, the entire disclosure of which is fully incorporated herein by reference.

For a printing sequence, the apparatus is disposed adjacent a medium, M, in a manner similar to the embodiment of FIG. 4. However, in contrast to the embodiment of FIG. 4, the apparatus is not held stationary against the medium during a printing sequence, but is manually swept over a printing area on the medium The apparatus may be swept over the printing area with an unconstrained natural sweeping motion without causing distortion of the printed image.

FIG. 5 illustrates a recording apparatus 10 comprising a housing 12, lens 14, viewfinder 16, display device 18, switches or keys 20, and actuator 22. The apparatus, including the sweep-type printer, is supported by two wheels or rollers 35 which are used as part of the distortion compensation electronic means, whose function is described fully in the '236 patent.

Figure 6:
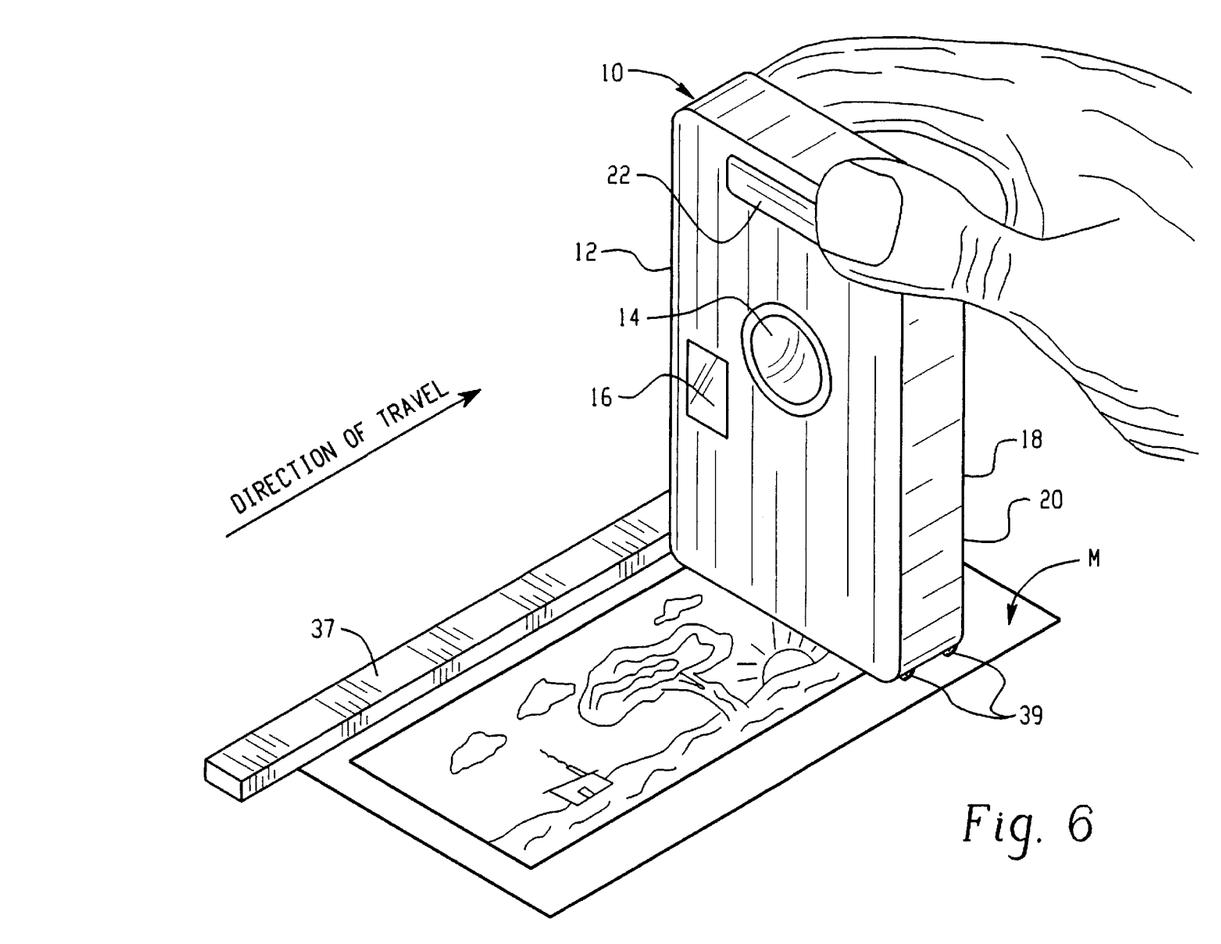
FIG. 6 is a simplified schematic perspective of a self contained and hand-held recording apparatus according to an embodiment of the present invention where the housing is manually swept in a straight fine over a printing area on a print medium outside the housing during a printing sequence.

With reference to FIG. 6, still another embodiment of the invention is illustrated. In this embodiment, the apparatus comprises the combination of an electronic camera, as in the previous three embodiments, and a sweep type hand-held printer without electronic compensation for nonlinear or pivoting motion.

As in the embodiment of FIG. 5, the recording apparatus 10 comprises a housing 12, lens 14, viewfinder 16, display device 18, switches or keys 20, actuator 22, and wheels or rollers 39. However, in contrast to the embodiment of FIG. 5, which uses electronic compensation to prevent image distortion due to tilting of the apparatus during a printing sequence, the embodiment of FIG. 6 relies upon the four individual wheels or rollers 39 to prevent tilting of the apparatus during a printing sequence. Alternatively, two full-length rollers may be used for example. Similarly, while the embodiment of FIG. 5 relies upon electronic compensation to compensate for distortion caused by movement of the printer over a curved, non-linear or irregular path, the embodiment of FIG. 6 relies upon operator skill to move the apparatus in a straight line during a printing sequence. A straight edge 37 may be used to assist the operator in this task. In all other respects, including the use of an encoder to monitor movement of the apparatus and the use of an inkjet print head, the embodiment of FIG. 6 is substantially the same as that of FIG. 5.

Figure 7:
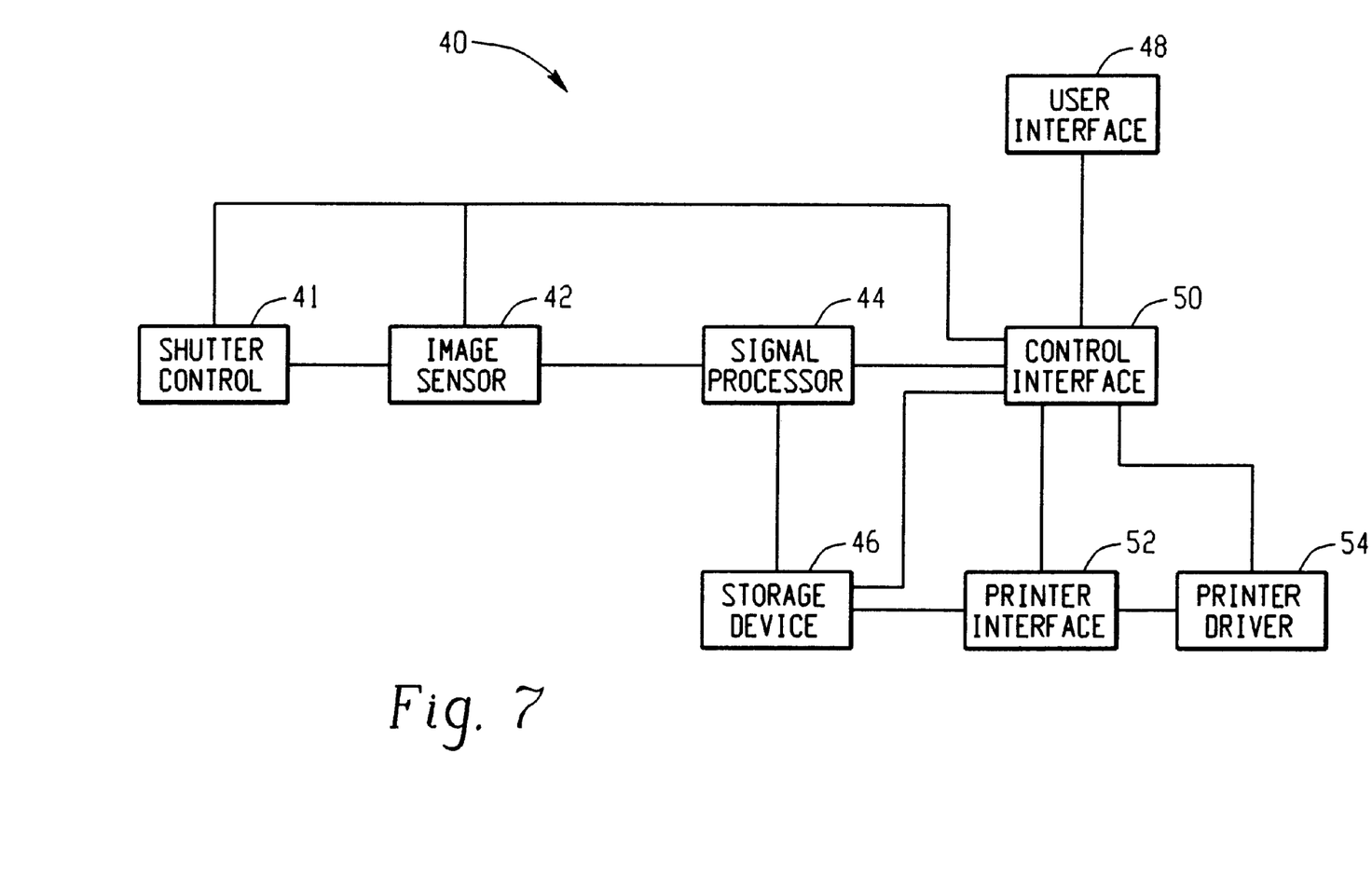
FIG. 7 is a simplified electrical schematic diagram of a recording apparatus according to the present invention.

With reference next to FIG. 7, there is shown in simplified block diagram form a control circuit 40 suitable for use with all the embodiments of the present invention described herein. Those skilled in the art will readily appreciate that various features of this control circuit 40 are optional and may be used or omitted as desired for a particular application.

In FIG. 7, an image sensor 42, such as a CCD array, is selectively exposed to an optical image via a shutter control 41 and the lens 14. The shutter control 41 is responsive to manual operation of the actuator 22 (FIGS. 1, and 4–6) when the apparatus is in picture taking mode, and may operate a physical shutter as in a conventional film-type camera, and/or it may simply initiate the capture of an image by the image sensor 42. The image sensor 42 is connected to a signal processor 44, and is used to convert an optical image into an image stored or processed in electronic form. The electronic "image" or data can be either an analog signal, in the case of an analog image sensor, or a digital data stream, in the case of a digital image sensor. The signal processor 44 may be used to further process the output of the image sensor 42, where such processing may include amplification, buffering, digitization, or other operations known to those skilled in the art. Where the output of the image sensor is digital, the signal processor may be a microprocessor designed for digital imaging applications such as, for example, part number MPC823 made by Motorola, Inc. Where the output of the image sensor is analog, the signal processor may be comprised of an analog to digital converter in addition to a suitable microprocessor. The signal processor 44 is connected to a storage device 46, which may be comprised of semiconductor memory, a magnetic tape drive, a floppy disk drive, a hard disk drive, or any other such devices as are known in the art and suitable for storing images electronically in either analog or digital form.

A user interface 48 includes the switches or keys 20, and actuator 22, as shown previously in FIG. 1, and is connected to a control interface 50, which controls and coordinates the operation of the apparatus 10 in response to commands entered through the user interface 48.

A printer interface 52 is responsive to control interface 50 and provides an interface between the storage device 46 and the printer driver 54. Interface functions may include, for example, digitization of an analog stored image, capture of a single frame of a stored motion picture image, amplification, buffering, level shifting, decompression, or such other functions as may be desired. Additionally, the printer interface may provide conversion of an image stored in the additive color format of RGB (for the primary colors of red, green and blue), as produced by the image sensor 42 and useful for display purposes, to the subtractive color format of CMYK (for the secondary colors of cyan, magenta and yellow and, optionally, black) useful for printing purposes. The printer driver 54 converts and conditions image signals to appropriate drive levels for the selected printer. For example, where an ink jet printer is used, the printer driver 54 will convert image signals to the voltages required to drive the individual ink jet nozzles. These control functions are well-known and practiced by those versed in the art with regard to the operation of separate electronic camera and printer apparatus, and may be implemented using discrete electronic circuits, application specific integrated circuits or one or more programmable microprocessors designed specifically for such control applications, such as, for example the MC68322 Integrated Printer Processor manufactured by Motorola, Inc.

Figure 8A:
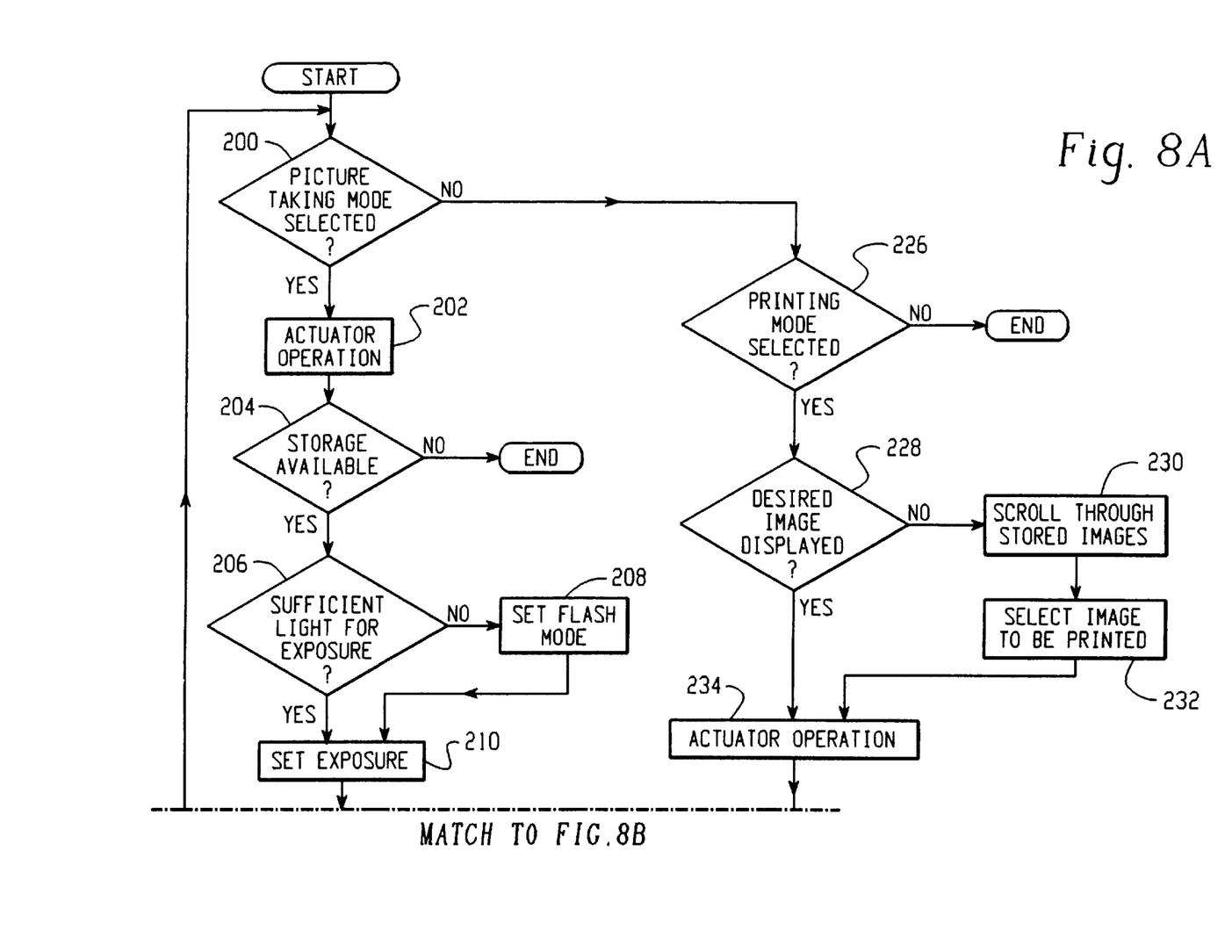
FIG. 8 is a flow chart for a control sequence of picture taking and printing operations in accordance with some of the aspects of the present invention.
Figure 8B:
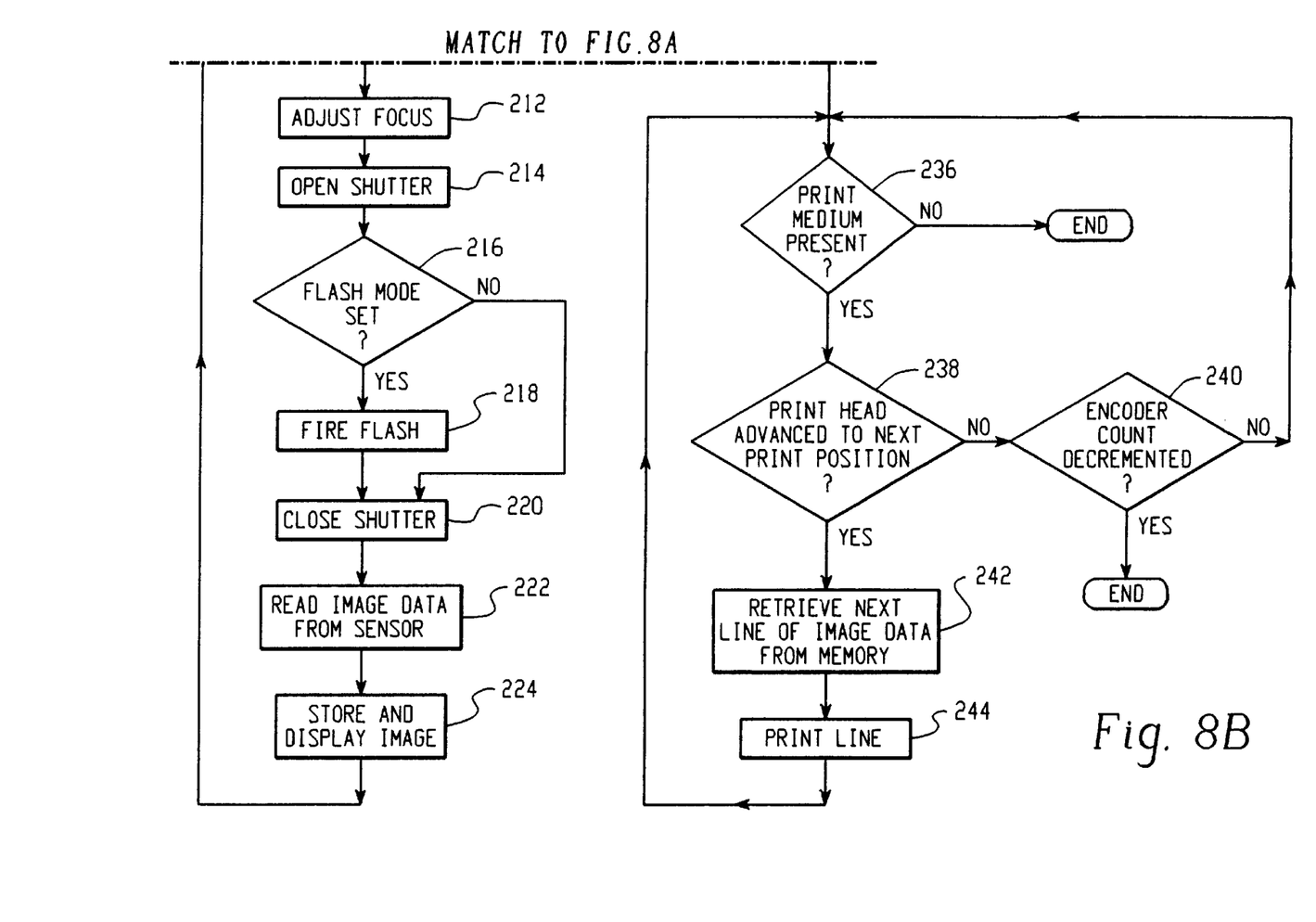

FIG. 8 is a flow chart illustrating the control sequence for one embodiment of the invention during picture taking and printing modes of operation. Specifically, the flow chart illustrates the control sequence for an embodiment comprising an electronic still camera having a digital image sensor, automatic focus and exposure control a flash automatically activated in low light conditions and a printer which is held stationary on the medium and utilizes a print head which moves during a printing sequence, as disclosed as one embodiment of the '730 patent.

Referring to FIG. 8, at step 200 the system tests whether or not it is set to picture taking mode. If in picture taking mode, upon operation of the actuator at step 202, the system checks at step 204 to see that sufficient storage is available in memory (or other storage device such as disk or tape) to permit recording of an additional image. If insufficient storage is available, the control sequence may terminate as shown, or may, alternatively, prompt the operator to replace the storage medium, delete one or more stored images, or take such other action as may make storage space available. If sufficient storage is available, the system determines at step 206 whether the ambient light level is sufficient to make an exposure. If not, the flash mode is activated at step 208. At step 210 the system sets the shutter speed and/or lens opening for proper exposure based upon the sensitivity of the image sensor, the light level and whether or not the flash mode has been activated. At step 212 the system adjusts focus. It will be understood that in embodiments which feature manual focusing, or a fixed focus lens, step 212 will be omitted. Similarly, in embodiments where exposure is either fixed or manually set by the operator, steps 206, 208 and 210 may be omitted.

At step 214, the shutter opens to begin the exposure. It is recognized that as used herein, the term "open shutter" may refer to operating a physical means for selectively admitting light, as in a conventional camera utilizing photographic film, or it may refer to electronically starting the process of recording an image in a solid-state image sensor. Similarly, the term "close shutter" may refer to either closing a physical shutter, or the cessation of the process of recording an image in a solid-state image sensor. After the shutter opens, the system tests at step 216 to determine if flash mode has been set, and if so, the flash is fired at step 218. At step 220 the shutter closes and recording of the image in the image sensor is completed. At step 222 the recorded image data is read from the sensor and stored in memory or on a medium such as a magnetic tape or disk. The recorded image can also be displayed.

The system once again tests, at step 200, whether it is set to picture taking mode. If so, the above described process is repeated and another picture is taken. If not in picture taking mode, the system tests at step 226 to determine if printing mode has been selected. If so, the operator can accept the displayed image, or scroll through images stored in the apparatus. Upon operation of the actuator at step 234 the printer begins a printing sequence as described both here and in the '730 patent. At step 236 the printer tests to determine that it is properly positioned on the print medium. If it is, at step 238 the system tests to determine if the print head has advanced to the next print position, i.e., if the print head has advanced to the initial point where printing is to start, or further advanced from the last print position to the next print position. If so, data stored in memory representing the next line of image data to be printed is retrieved and printed at steps 242 and 244. Note that the medium present test at step 236 is repeated throughout a printing operation. When the encoder count is decremented as at step 240, this indicates that the print head has reversed direction and the printing operation has been completed. Note that the actual printing of the image would have terminated prior to this step, as the last line of image data would correspond to a print head position reached before the end of forward travel of the print head.

Those skilled in the art will appreciate that the various embodiments illustrated herein can be modified to include or exclude various features within the scope of the invention. For example, an electronic camera can be provided with a printer which is held stationary on an external print medium during a printing sequence; or alternatively a printer which prints on a print medium inside the apparatus.

The present invention thus provides a fully self contained and hand-held recording apparatus that can record a photographic image, then produce a print of the image on paper or any other printer compatible medium.

While the invention has been shown and described with respect to specific embodiments thereof this is for the purpose of illustration rather than limitation, and other variations and modifications of the specific embodiments herein shown and described will be apparent to those skilled in the art within the intended spirit and scope of the invention as set forth in the appended claims.

I claim:

1. A camera and printer apparatus, comprising: a handheld housing; an electronic camera disposed in the housing for converting an optical image into an electronic image; and a printer disposed in the housing for printing, in response to said electronic image on a medium outside the apparatus, said housing being manually held stationary against a surface of the medium during a printing sequence; said printer comprising a print head that is stationary during a printing sequence; said print head having nozzles thereon for projecting ink and being adapted for printing on said medium by projecting ink out of said nozzles across a gap between said medium and said print head.

2. The apparatus of claim 1 wherein said printer comprises an areal array of ink jet nozzles positionally fixed within said housing during a printing sequence.

3. The apparatus of claim 1 wherein said printer comprises and inkjet printer.

4. A camera and printer apparatus comprising: a handheld housing; an electronic camera disposed in the housing for converting an optical image into an electronic image; a color printer disposed in the housing for printing in response to said electronic image on a medium outside the apparatus, said housing being held stationary during a printing sequence and said color printer comprising a print head that moves within said housing between said first and second positions during a printing sequence, said print head having nozzles thereon for projecting ink and being adapted for printing ink on said medium by projecting ink out of said nozzles across a gap between said medium and said print head.

* * * * *